US007031417B2

(12) United States Patent
Jin

(10) Patent No.: US 7,031,417 B2
(45) Date of Patent: Apr. 18, 2006

(54) METHOD AND APPARATUS FOR SYNCHRONIZATION OF CLOCKS

(76) Inventor: Lin Jin, 16 Yuqian Road Building 313-1 Entrance 2, Apartment 6, Beijing 100854 (CH)

( * ) Notice: Subject to any disclaimer, the term of this patent is extended or adjusted under 35 U.S.C. 154(b) by 780 days.

(21) Appl. No.: 10/086,230

(22) Filed: Feb. 27, 2002

(65) Prior Publication Data

US 2003/0035500 A1 Feb. 20, 2003

Related U.S. Application Data

(60) Provisional application No. 60/271,950, filed on Mar. 1, 2001.

(51) Int. Cl.
*H04L 7/00* (2006.01)

(52) U.S. Cl. ...................................... 375/354; 327/144

(58) Field of Classification Search ................ 375/354, 375/356, 357

See application file for complete search history.

(56) References Cited

U.S. PATENT DOCUMENTS

| | | | | |
|---|---|---|---|---|
| 3,900,847 | A * | 8/1975 | Steele | 342/30 |
| 4,001,690 | A * | 1/1977 | Mack et al. | 455/13.2 |
| 5,920,278 | A * | 7/1999 | Tyler et al. | 342/33 |
| 6,400,754 | B1 * | 6/2002 | Fleming et al. | 375/140 |
| 2002/0041687 | A1 * | 4/2002 | Parks et al. | 380/263 |

* cited by examiner

*Primary Examiner*—Stephen Chin
*Assistant Examiner*—Jia Lu
(74) *Attorney, Agent, or Firm*—Lawrence S. Cohen

(57) ABSTRACT

Clocks are synchronized using a reference clock in two possible ways. One method uses two-way communication between a reference clock and a moving clock. The other method uses one-way communication from the moving clock.

14 Claims, 6 Drawing Sheets

FLOWCHART FOR SYNCHRONIZATION USING ONE-WAY COMMUNICATIONS

SPACETIME DIAGRAM FOR SYNCHRONIZATION USING TWO-WAY COMMUNICATION

CORRECTION (SYNCHRONIZATION) OF SATELLITE CLOCK BY TWO-WAY COMMUNICATION AND SUBSEQUENT SYNCHRONIZATION OF A CLOCK C

SPACETIME DIAGRAM FOR SYNCHRONIZATION OF CLOCKS USING ONE-WAY COMMUNICATION

SYNCHRONIZATION OF CLOCKS BY ONE-WAY COMMUNICATION

FLOWCHART FOR SYNCHRONIZATION USING ONE-WAY COMMUNICATIONS

APPARATUS FOR SYNCHRONIZATION OF CLOCKS USING ONE-WAY COMMUNICATION

METHOD AND APPARATUS FOR SYNCHRONIZATION OF CLOCKS

RELATED APPLICATION

This application is based on provisional application Ser. No. 60/271,950 filed on Mar. 1, 2001 and claims priority of that date. The entire content of the provisional application is incorporated herein by reference.

FIELD OF THE INVENTION

This application relates to the synchronization of clocks using, in one application, signals from orbiting satellites such as in the Global Positioning System (GPS) and GLONASS.

BACKGROUND OF THE INVENTION

In industry there is a business segment which provides electronic devices which yield precise time. Some of these devices derive high precision time through a transfer process whereby they transfer time from a satellite system. One such satellite system is the Global Positioning System (GPS). Various manufacturers use GPS receivers in which precise time is derived from one of the atomic clocks in the satellites (GPS Time Receiver). These are known by various names such as GPS Time Receivers, Time & Frequency Standards, and other names. Sometimes they also provide precise frequency measurement. Such Time Receivers are sold for a variety of applications where precise time is important. In certain applications there is a need to synchronize these Time Receivers with each other. One such application area is the synchronization of telecommunications signals. The synchronization process is handled in a number of conventional ways.

When satellite clocks are required to be instantaneously synchronized with each other at the nanosecond level difficulties arise due to the misapplication or misinterpretation of the relativistic effects and gravity effects between a moving clock in a satellite and a stationary Time Receiver on the ground. This invention is a new and nontraditional method for performing a synchronization process that enables instantaneous synchronization of such Time Receivers (clocks) to a high level of precision. One use of this invention could be to modify an existing clock to perform the synchronization process defined in this patent application.

As refered to above, the problem addressed in this disclosure is the instantaneous synchronization of two or more clocks located at different positions in a given spatial coordinate system, by means of either two-way or one-way radio communication between clocks. Generally, some or all of the clocks will be in motion relative to that coordinate system. In a typical application the coordinate system is attached to the earth, and some of the clocks would be on the surface of the earth, while others would be in satellites orbiting the earth. The satellite clocks would typically be atomic (Rubidium or Cesium), and the earthbound clocks might be either crystal oscillator or atomic.

When some of the clocks are in moving satellites, in one aspect of the invention synchronization requires that relativistic effects be taken into account.

Einstein's theory of Special Relativity is based on two postulates. The first is commonly called the relativity postulate, which states that for any two inertial frames in uniform relative motion, the laws of physics within each frame are identical. The second postulate is that the speed of light is constant, regardless of the inertial frame in which it is measured.

Einstein showed that if both postulates are assumed, that neither time nor distance is absolute. Specifically, if measurements of the time interval and/or distance between two events in space-time are made within each of two inertial frames in relative motion, the measurements will differ.

The non-absolute nature of time posited by the Special Theory of Relativity poses complications in the process of time synchronization, and has led to errors resulting from misapplication of the Special Theory.

The invention described herein removes the complications imposed by the Special Theory, by assuming only the first of Einstein's two postulates to produce a space-time theory in which time can be regarded as absolute. As a consequence, distance and velocity are defined somewhat differently, but the process of time synchronization is made extremely simple.

SUMMARY OF THE INVENTION

In one aspect the invention is a method for synchronizing one clock to another clock or a plurality of clocks to a given clock; in one particular case where one clock defined as a reference clock is on the earth and another clock is in a satellite which is in translatory motion relative to the reference clock. In that case, the method is to synchronize the satellite clock to the reference by making measurements of times of transmissions and arrival of a sequence of two-way transmissions and using those measurements deriving a correction term to be applied to the satellite clock. In one aspect of this case, the satellite clock is reset according to the correction and in another aspect of this case the correction term is used along with the satellite clock reading. Further, in the latter aspect the correction term may be applied in the satellite and a corrective time broadcast or in an alternative the satellite time and the correction term are both broadcast to user equipment which performs the correction.

Another primary aspect of the invention is referenced to as one-way communication, meaning communication from a satellite to two or more ground stations whose clocks are designed to be synchronized. For convenience, one of the ground stations is designated as the reference station or clock. Notably, where there is a plurality of ground stations, they can all be synchronized to the reference station simultaneously, or by designated groups or serially, depending on the communication system between the reference station and the other stations. In the one-way communication aspect first a corrective term representing difference in time reading between the reference station and the satellite is obtained, then a corrective term representing the difference in time reading between the next station, or stations and the satellite is obtained, then the difference between the corrective term is obtained, one that difference is applied to the station (clock) to be synchronized to the reference station.

In another aspect, applied to a specific system such as GPS, the invention is implemented between a GPS ground control station and the satellite to determine a correction term for each satellite. Then the satellite can use the corrective term locally (at the satellite or broadcast it along with a time signal so that the correction calculation is done by the user).

DETAILED DESCRIPTION

Following are descriptions of methods and apparatus for synchronizing clocks according to the invention.

In describing the synchronization process, it is convenient to regard one of the clocks as a reference to which other clocks will be synchronized. This reference clock will be called clock A in the following discussion. In some applications, clock A is located on the surface of the earth, and the clocks to be synchronized are either on the surface of the earth or in satellites orbiting the earth. Also clock A could be located in an orbiting satellite. However, for convenience of the explanation, clock A is described as being located on the surface of the earth.

If another clock is to be synchronized to clock A, and there are no other clocks available, then two-way line-of-sight radio transmissions may be employed to synchronize the second clock, but one-way transmissions are not enough to accomplish this unless additional information is available. It is also necessary that the clocks be visible to each other. On the other hand, it may be possible for the second clock to be synchronized with only one-way transmissions from a third clock which has both clock A and the second clock in view, even if the latter two clocks are not be visible to each other. This will generally require that the third clock broadcast certain information regarding its position and events (epochs) of signal transmission as a function of time. Such is the case if the third clock is located in a Global Positioning System (GPS) satellite or a GLONASS satellite.

Synchronization Using Two-Way Radio Transmissions

Figure 1:
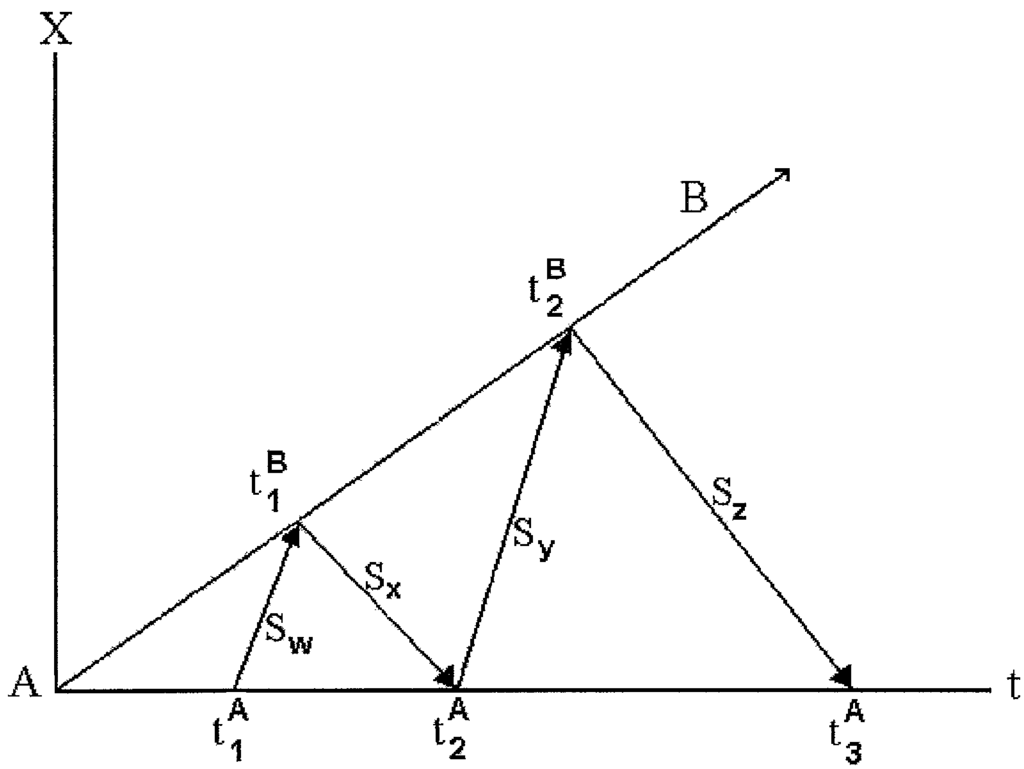
FIG. 1 SpaceTime diagram for synchronization using two-way communication
Figure 2:
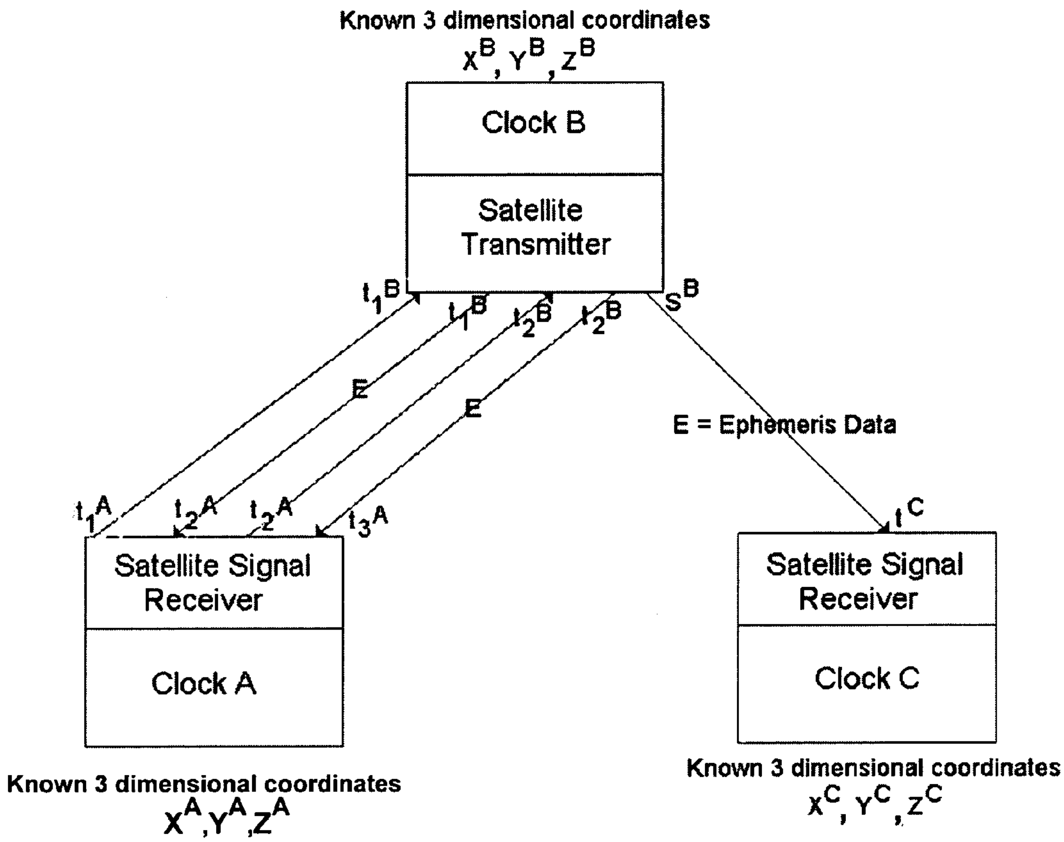
FIG. 2 Correction (synchronization) of satellite clock using two-way communication and subsequent synchronization of a clock C FIG. 3 SpaceTime diagram for synchronization of clocks using one-way communication FIG. 4 Synchronization of clocks using one-way communication FIG. 5 Flowchart for synchronization using one-way communications FIG. 6 Apparatus for synchronization of clocks using one-way communication
Figure 3:
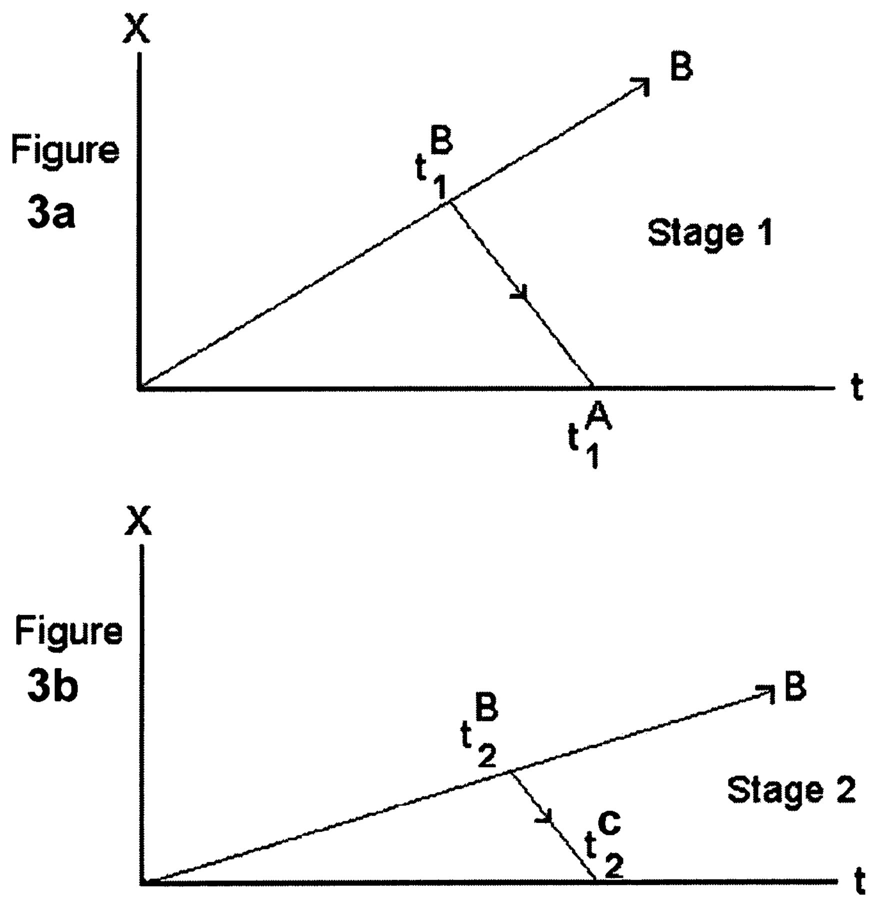
Figure 4:
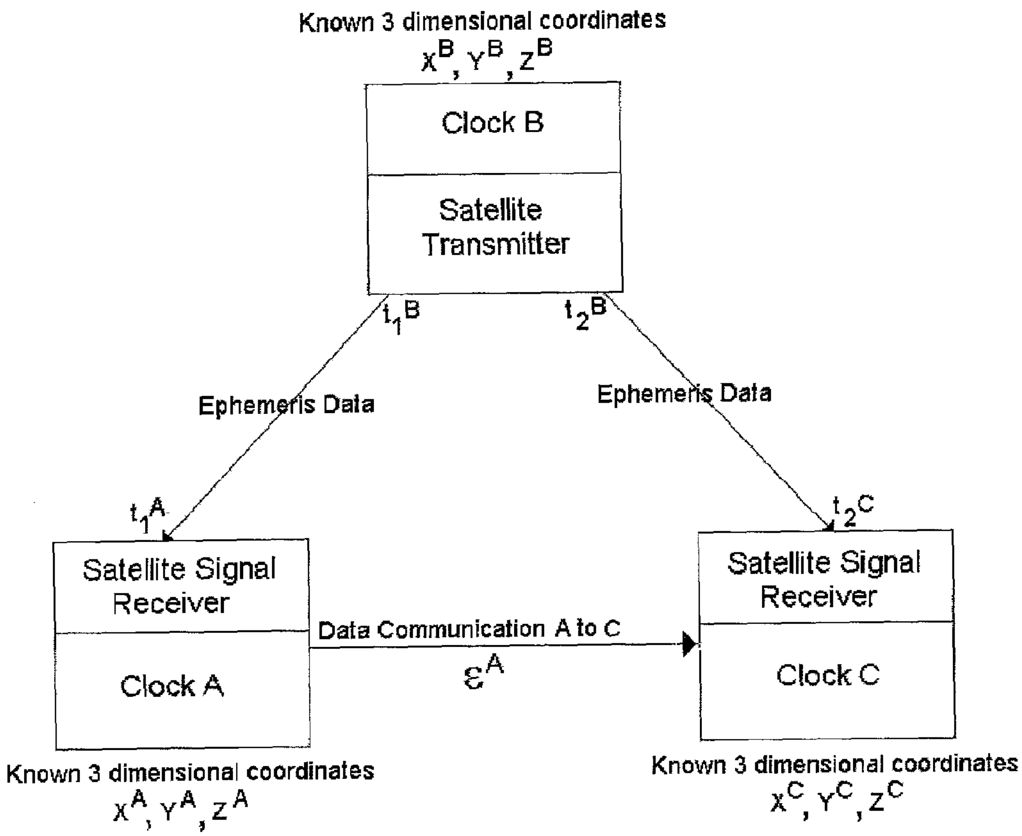
Figure 5:
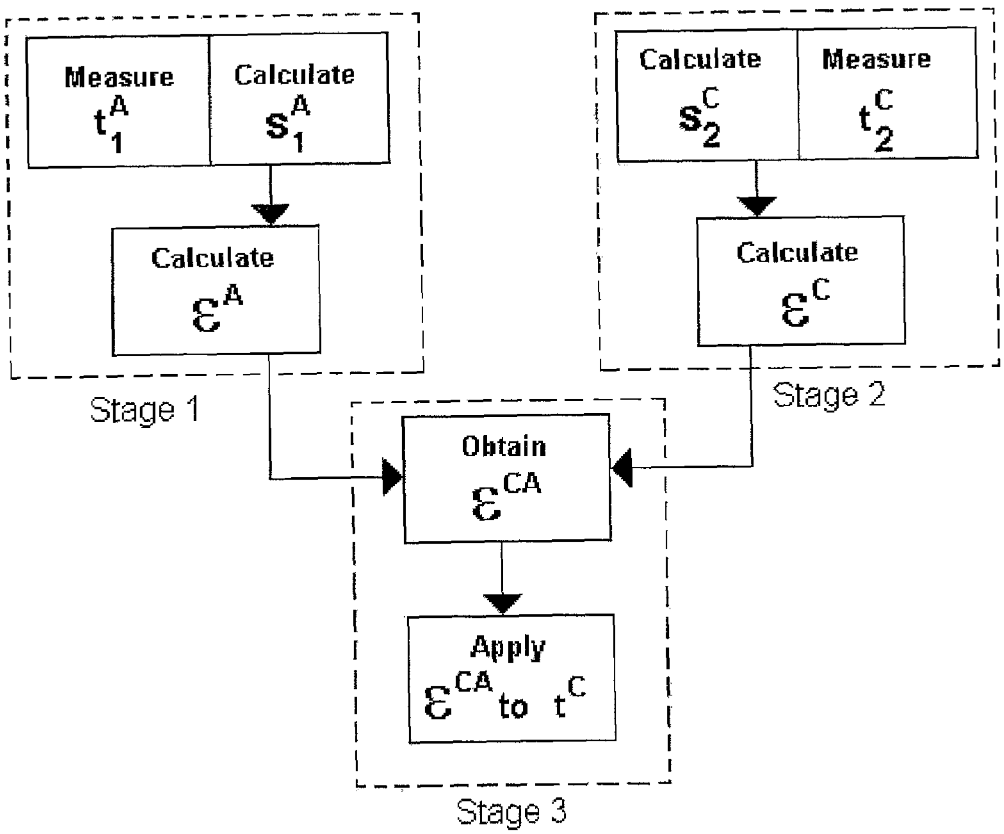

Understanding of the following explanation will be aided by referring to FIGS. 1 and 2. Consider the case involving three clocks, denoted by A, B, and C. Clock A is considered to be the reference clock, and clocks B and/or C are to be synchronized to clock A. Clocks A and C are visible from clock B, but clocks A and C may not be visible to each other. Although clocks B and C might be moving relative to clock A, we assume here that clock C is fixed relative to clock A, and that clock B has uniform motion relative to the other two clocks.

Co-located with each clock is a radio station and a computer. It is assumed that the radio station in clock A is capable of two-way communication with the radio station in clock B, and that clock B can send a one-way signal to clock C. For notational simplicity, the letters A, B, and C will also be used to identify the locations of the clocks, as well as the radio stations/computers associated with each clock.

Clocks A and C are assumed to be at rest with precisely known locations within a 3-dimensional inertial (i.e. non-accelerating) coordinate system, and clock B has uniform translatory motion (i.e., constant velocity) relative to the inertial system. All three clocks are identical in the sense that they would run at precisely the same rate if they were all stationary within the same inertial frame. However, the clocks may have been initialized differently, so their times may not agree.

We first describe the two-way synchronization of clock B to clock A followed by a synchronization of clock C to clock B, from which a synchronization of clock A to clock C can be established. The synchronization process uses absolute time within the new space-time model described above.

Measurement of Relative Motion

Before synchronization can be achieved, measurements must be made which characterize the radial velocity of clock B relative to clock A. These measurements are made using clocks A and B, and do not involve clock C. An important parameter needed for the synchronization process is called the characteristic parameter of relative motion, and is denoted by $\xi$. This parameter is a measure of the relative radial velocity of clocks A and B, which is the rate at which the distance between A and B is changing with respect to time. To define $\xi$, assume that A sends two signals to B which are spaced $\Delta t_A$ seconds apart according to clock A. Due to the relative motion of clocks A and B, the two signals will generally arrive at clock B with a different time spacing as measured by clock B. The parameter $\xi$ is simply the ratio of the latter time spacing to the former, i.e., the two signals arrive with time spacing $\xi\Delta t_A$ according to clock B. Because the relative motion of A and B is uniform, $\xi$ does not depend on the times that the two signals were transmitted from A; in particular $\xi$ does not depend on $\Delta t_A$. Note that if there is no relative motion between A and B, then the time spacing between the two signal arrival times is equal to the spacing between the transmission times; in this case, $\xi=1$.

On the other hand, suppose that the direction of signal transmissions is reversed, so that B sends two signals to A which are spaced $\Delta t_B$ seconds apart according to clock B. According to the relativity postulate, the symmetry of relative motion of A and B will result in the two signals arriving at clock A with time spacing $\xi\Delta_B$ according to clock A.

The parameter $\xi$ can be determined from a sequence of measurements made by sending radio signals back and forth between A and B. This process is diagrammed in FIG. 1. Suppose a radio signal $S_w$ is transmitted from A at time $t_1^A$ according to clock A, with the time of transmission $t_1^A$ as a message for B. The signal $S_w$ is received at B at time $t_1^B$ according to clock B. B instantly records $t_1^A$ and $t^1{}_B$, and simultaneously transmits back to A a signal $S_x$ containing time $t_1{}^B$ as a message for A. The signal $S_x$ is received at A at time $t_2^A$ according to clock A. A instantly records $t_1^B$ and $t_2^A$, and simultaneously transmits back to B a signal $S_y$ containing time $t_2^A$ as a message for B. The signal $S_y$ is received at B at time $t_2^B$ according to clock B. B instantly records $t_2^A$ and $t_2^B$, and simultaneously transmits back to A a signal $S_z$ containing $t_2^B$ as a message for A. This signal arrives at A at time $t_3^A$ according to clock A. At this point in time, A has knowledge of $t_1^A$, $t_2^A$, $t_3^A$, $t^{1B}$, and $t_2^B$, which constitute all the basic measurements needed to establish the relative motion parameter $\xi$. It should be noted that B also knows all of these measurements, except for $t_3^A$, and could have knowledge of $t_3^A$ by an additional message transmitted from A.

From the definition of ξ given above, we see that $$\xi = \frac{t_2^B - t_1^B}{t_2^A - t_1^A} = \frac{t_3^A - t_2^A}{t_2^B - t_1^B}. \quad (1)$$

Since ξ depends only on the ratio of time differences, it is independent of how the clocks were initialized, so that it can be determined before any attempt has been made to synchronize clock B to clock A. Taking the product of the two expressions for ξ above and taking the square root, we can obtain an expression for ξ in terms of only the reception times at clock A:

$$\xi = \left(\frac{t_3^A - t_2^A}{t_2^A - t_1^A}\right)^{\frac{1}{2}}. \quad (2)$$

Definition of Synchronization

The process of determining ξ normally can be done so rapidly that the relative radial velocity of clocks A and B can be considered constant during the interval that the measurements are being taken. If the relative radial velocity of clocks A and B thereafter remained constant and nonzero, at some point in time (possibly prior to the measurements described above) the distance between A and B would be zero, i.e., the clocks would coincide. Such an event is fictional, because the trajectories of the clocks will never permit them to be at the same position at any point in time. However, by assuming a constant relative radial velocity we can define the fictional moment of spatial coincidence which is useful in defining synchronization. We define clocks A and B to be synchronized if they would indicate exactly the same time at this fictional moment of coincidence (the situation when A and B have no relative motion will be dealt with later).

In the above sequence of signal transmissions and receptions, the times $t_1^B$ and $t^{2B}$ are measurements made by clock B before it has been synchronized. If B were synchronized to A, the time readings $t_1^B$ and $t_2^B$ would become $s_1^B$ and $s_2^B$ ("s" is used to denote "synchronized"), but $t_1^A$, $t_2^A$, and $t_3^A$ would remain the same. Clock B can be synchronized by resetting it so that it would read $s_1^B$ at the moment it would otherwise read $t_1^B$. This is accomplished by determining $s_1^B$, which determines the correction $s_1^B - t_1^B$ that needs to be applied, defined as $\epsilon^B$.

One determines $s_1^B$ by assuming the clocks were synchronized, so that each would indicate the same time $t_0$ at the fictional moment of spatial coincidence. Imagine that A sends a radio signal at that very moment. The signal is simultaneously received at B at time $t_0$ according to synchronized clock B. Let us also consider the signal sent by A at time $t_1^A$ and received at unsynchronized time $t_1^B$, as previously discussed. This reception time is $s_1^B$ according to synchronized clock B. Using the definition of ξ, we have $$\xi = \frac{s_1^B - t_0}{t_1^A - t_0}. \quad (3)$$

On the other hand, still assuming the clocks synchronized, imagine that at the moment of coincidence, B sends a radio signal at time $t_0$ according to clock B. The signal is simultaneously received at A at time $t_0$ according to clock A. Let us also consider the signal sent by B at unsynchronized time $t_1^B$ and received by A at time $t_2^A$, as previously discussed. The transmission time is $s_1^B$ according to synchronized clock B. Again, according to the definition of ξ, we have $$\xi = \frac{t_2^A - t_0}{s_1^B - t_0}. \quad (4)$$

Taking the product of expressions (3) and (4), we obtain $$\xi^2 = \frac{t_2^A - t_0}{t_1^A - t_0}. \quad (5)$$

Then, $$t_0 = \frac{1}{\xi^2 - 1}(\xi^2 t_1^A - t_2^A). \quad (6)$$

Substituting (6) back into (3) and performing algebraic simplification results in a solution for the value that $s_1^B$ that $t_1^B$ should have if clocks A and B were synchronized:

$$s_1^B = \frac{1}{\xi + 1}(t_2^A + \xi t_1^A). \quad (7)$$

Note that if there is no relative motion between A and B, then expression (7) will still give a correct value for $s_1^B$ by using ξ=1, even though there may be no point in time where clocks A and B coincide.

It can now be seen that as soon as $t_1^A$, $t_1^B$, and $t_2^A$ and $t_2^B$ have been measured, the parameter ξ can be computed from (1), and then $s_1^B$ can be computed from (7). Synchronization of clock B can be accomplished in two equivalent ways:

Method 1: Add the correction term $\epsilon^B = s_1^B - t_1^B$ to any unsynchronized reading of clock B.

Method 2: Reset clock B by incrementing its indicated time by $\epsilon^B$ seconds.

After synchronization is achieved, we now regard time as absolute, i.e., we freely use times observed by clocks A and B to calculate distances and velocities in the same way that would be done in a Newtonian system, that is, one in which relativistic time and distance dilation is ignored.

At this point we assume clock B has been synchronized by method 2 above. After the clock is reset, its time readings will be denoted with s rather than t. For example, clock B's reading of $t_1^B$ at the instant of reception of the signal $S_w$ sent by A is replaced by $s_1^B$. Without loss of generality, we may also assume that $t_0 = 0$ in expression (6), since the value of $t_0$ never appears in expression (7).

Define the starred distance $d_1^{AB*}$ from A to B at the instant $s_1^B$ of reception of the signal sent by A at time $t_1^A$, as follows:

$$d_1^{AB*} = c(s_1^B - t_1^A), \quad (8)$$

where c is the velocity of light in the 3-dimensional coordinate system as it travels from A to B.

After substituting expression (7) for $s_1^B$ into (8), we obtain the alternate expression $$d_1^{AB*} = \frac{c}{\xi+1}(t_2^A - t_1^A). \quad (9)$$

Now define the starred radial velocity $v_r^{AB*}$ between A and B as follows:

$$\begin{aligned} v_r^{AB*} &= \frac{d_1^{AB*}}{s_1^B} \\ &= \frac{c}{\xi+1}(t_2^A - t_1^A) \Big/ \frac{1}{\xi+1}(t_2^A + \xi t_1^A) \\ &= c\frac{t_2^A - t_1^A}{t_2^A + \xi t_1^A}. \end{aligned} \quad (10)$$

An alternate expression for $v_r^{AB*}$ can be obtained by substituting $t_0=0$ in (5) to obtain $$\frac{t_2^A}{t_1^A} = \xi^2, \quad (11)$$

and then substituting into (10) to obtain $$v_r^{AB*} = c\frac{\xi - 1}{\xi}. \quad (12)$$

With starred radial velocity defined, the starred distance from A to B at an arbitrary time $t^B$ according to clock B is given by $$d^{AB*} = v_r^{AB*} s^B, \quad (13)$$

where uniform translatory motion is assumed.

It should be noted that the above definitions of starred position and starred radial velocity are different from those that would normally be used within an inertial frame. An important consequence of these nontraditional definitions is that the speed of light in propagating from A to B (uplink speed) has the traditional value c, but the speed from B to A (downlink speed) is $c-v_r^{AB*}$. This can be shown as follows: Treating time as absolute, the downlink speed of light $c^*$ is $$c^* = \frac{\text{distance between } A \text{ and } B \text{ at time } s_1^B}{\text{propagation time from } B \text{ to } A} = \frac{d_1^{AB*}}{t_2^A - s_1^B}. \quad (14)$$

Substitution of expression (8) for $d_1^{AB*}$ yields $$c^* = c\frac{s_1^B - t_1^A}{t_2^A - s_1^B}. \quad (15)$$

Substitution of expression (7) for $s_1^B$, followed by algebraic simplification, gives $$c^* = \frac{c}{\xi}. \quad (16)$$

By solving expression (12) for ξ in terms of $v_r^{AB*}$ and substituting into (16), the final result is $$c^* = c - v_r^{AB*}. \quad (17)$$

This result is important in the synchronization of clock C, which will now be described. It will also be used in the method of synchronization using one-way signal transmissions, to be described later.

Using Clock B to Synchronize Clock C with Clock A

Clock C can now be synchronized to clock A by receiving a one-way downlink signal transmission from B with a message containing the transmission time $s^B$ according to synchronized clock B, and ephemeris data which permits determination of the velocity vector $\bar{v}^B$ and the position of clock B at time $s^B$ in the coordinate frame containing clocks A and C. Since the position of clock C is precisely known, the radial velocity $v_r^{CB}$ and starred distance $d^{CB*}$ from C to B can be determined at time $s^B$. Let the arrival time of the signal as measured by unsynchronized clock C be denoted by $t^C$. The signal arrival time $s^C$ measured when clock C is properly synchronized is given by $$s^C = s^B + \frac{d^{CB*}}{c - v_r^{CB}}. \quad (18)$$

Clock C may now be synchronized to clock B (hence to clock A) by one of two methods:

Method 1: Add the correction $\epsilon^C = s^C - t^C$ to any unsynchronized time of clock C.

Method 2: Reset clock C by incrementing its indicated time by $\epsilon^C$ seconds.

Synchronization Using One-Way Signal Transmissions

Understanding of the following explanation will be aided by reference to FIGS. 3, 4, 5 and 6. Synchronization of two clocks using only one-way signal transmission from a third clock is also possible using the concepts of this invention. Here the two clocks to be synchronized will be denoted by A and C, and the third clock by B. A radio receiver is co-located with clock A and a radio receiver is also co-located with clock C. Co-located with clock B is a transmitter.

For simplicity of explanation, clocks A and C are assumed to be at rest with precisely known locations within a three-dimensional coordinate system fixed to the earth, and clock B may be moving within this system. A typical coordinate system is the GPS Earth-Centered, Earth Fixed (ECEF) system with orthogonal x-, y-, and z-axes meeting at an origin located at earth's center. The coordinates of clocks A, B, and C will be denoted respectively by $(x^A, y^A, z^A)$, $(x^B, y^B, z^B)$, and $(x^C, y^C, z^C)$.

Clock B broadcasts a radio signal which can be received by clocks A and C. The signal contains a navigation message with satellite ephemeris data which permits A and C to know the precise location $(x^B, y^B, z^B)$ and velocity vector $\bar{v}^B$ of clock B within the ECEF coordinate system at every moment of time as read by clock B. The signal also contains periodically occurring identifiable points in the signal structure called epochs, and the navigation message contains information which permits clocks A and C to identify the precise transmission time of each epoch according to clock B.

Synchronization of clock C with clock A can be accomplished in a procedure that, for convenience, can be defined as having three stages.

Figure 6:
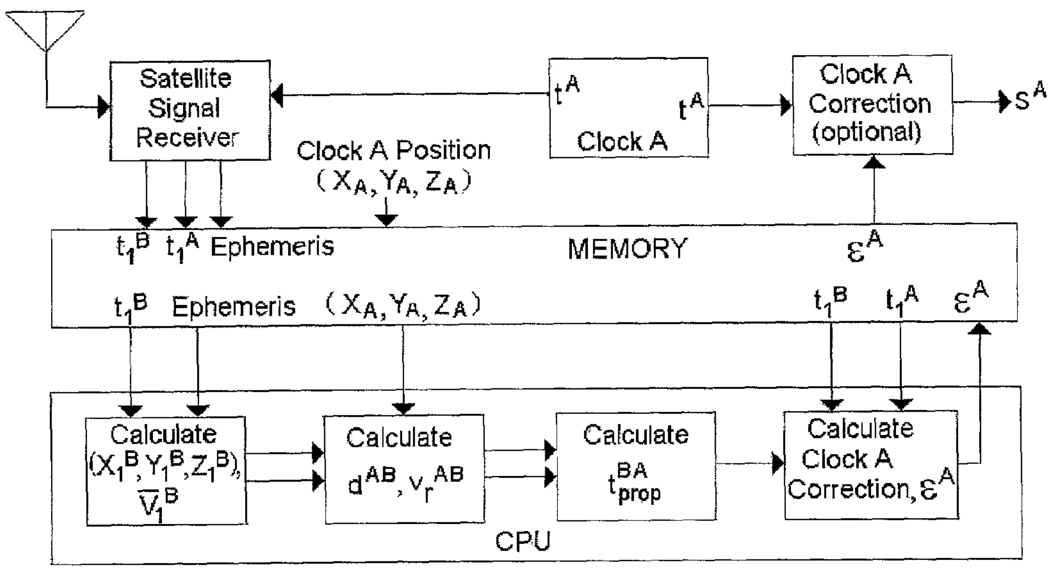

Stage 1 could be defined as a process for determining a correction for clock A that would be needed at clock A as if clock A was to be synchronized to satellite clock B. That correction is defined as $\epsilon^A$. Stage 1 consists of calculations which normally take place at clock A. FIG. 6 is a block diagram of an apparatus for performing the calculations of stage 1.

Stage 2 could be defined as a process for determining a correction for clock C that would be needed at clock C as if clock C was to be synchronized with satellite clock B. That correction is defined as $\epsilon^C$. Stage 2 consists of calculations that are similar to those of stage 1 and which normally take place at clock C and stage 2 uses an apparatus identical to that used for stage 1 for the stage 2 calculations, so FIG. 3 can also be used as a block diagram for the stage 2 calculations by changing every occurrence of the letter A to letter C.

Stage 3 defines a process of determining a correction term to be applied to clock C to directly synchronize it with clock A. That correction term is $\epsilon^{CA}$, Stage 1: Clock A receives the signal broadcast from clock B and records the time $t_1^A$ of reception of a specific epoch according to clock A. Clock A also extracts from the navigation message and records the time $t_1^B$ of transmission of the epoch according to clock B. It should be noted that time as indicated by clock B is proper time, that is, it is uncorrected for relativistic effects, and does not need to be synchronized with clock A. Clock A uses the ephemeris data contained in the received signal to calculate the precise location $(x_1^B, y_1^B, z_1^B)$ and velocity vector $\bar{v}_1^B=(v_{1x}^B, v_{1y}^B, v_{1z}^B)$ of B at the moment $t_1^B$ of epoch transmission.

At clock A the distance $d^{AB}$ from clock A to clock B at the moment $t_1^B$ of epoch transmission is calculated:

$$d^{AB}=\sqrt{(x_1^B-x^A)^2+(y_1^B-y^A)^2+(z_1^B-z^A)^2}. \tag{19}$$

Also calculated is the radial component $v_r^{AB}$ of relative velocity between A and B (the component which lies along the line of sight from A to B) according to the formula $$v_r^{AB}=\bar{v}_1^B\cdot\bar{u}^{AB}, \tag{20}$$

where $\bar{u}^{AB}$ is a unit vector pointing along the line of sight from A to B at the moment of epoch transmission, and the dot indicates the dot (or inner) product of the two vectors. A positive value of $v_r^{AB}$ corresponds to a distance from A to B which is increasing with time. An alternative method of determining $v_r^{AB}$ is to compute it by measuring the signal Doppler shift $\Delta f$ in Hertz at clock A and using the formula $$\begin{aligned} v_r^{AB} &= -\lambda(\Delta f) \\ &= -c\frac{\Delta f}{f}, \end{aligned} \tag{21}$$

where f is the carrier frequency transmitted by the satellite, $\lambda$ is the corresponding wavelength at the propagation speed c of light in free space. A positive value of $\Delta f$ corresponds to negative value of $v_r^{AB}$.

At clock A the propagation time of the signal epoch in traveling from B to A is calculated according to the formula $$t_{prop}^{BA} = \frac{d^{AB}}{c - v_r^{AB}}. \tag{22}$$

This formula is different from common practice in that the denominator is not the speed of light, but the speed of light reduced by the relative radial velocity of the satellite. The reason for this difference is that, in common practice, an attempt is made to correct the readings of clock B for relativistic effects of satellite motion and earth rotation relative to an inertial frame, prior to computing the propagation time $t_{prop}^{BA}$. However, such corrections are unnecessary and lead to misapplication of the Lorentz transformations developed by Einstein. By using only proper times (i.e., uncorrected times of freely running clocks) and regarding time as absolute, no corrections of the satellite clock is necessary, but the formula for $t_{prop}^{BA}$ changes to that shown above.

An epoch arrival time $s_1^A$ at clock A is now calculated, which is based on clock B's transmission time and the signal propagation time, in contrast to the direct measurement of arrival time $t_1^A$ by clock A:

$$\begin{aligned} s_1^A &= t_1^B + t_{prop}^{BA} \\ &= t_1^B + \frac{d^{AB}}{c - v_r^{AB}}. \end{aligned} \tag{23}$$

The last step in the calculation at clock A is to compute the correction term $$\epsilon^A=s_1^A-t_1^A \tag{24}$$

for clock A. At this point, clock A could be synchronized to clock B in the satellite if desired, either by adding $\epsilon^A$ to any unsynchronized reading of clock A, or by resetting clock A by incrementing its reading by $\epsilon^A$ as soon as $\epsilon^A$ has been determined. However, if clock A is itself a time reference station, such a synchronization would not normally be performed.

Stage 2: Stage 2 is identical in all respects to the calculations made by clock A, except that the calculations use data from the signal as received at clock C. FIG. 6 serves as a block diagram of an apparatus for performing these calculations if every occurrence of superscript A is replaced with superscript C.

Clock C receives the signal broadcast from clock B and records the time $t_2^C$ of reception of a specific epoch according to clock C. This epoch may be the same epoch record by clock A, or it may be a different epoch. Also the epoch could be transmitted before or after the epoch used by clock A. Clock C also extracts from the navigation message and records the time $t_2^B$ of transmission of the epoch according to clock B. Clock C uses the ephemeris data contained in the received signal to calculate the precise location $(x_2^B, y_2^B, z_2^B)$ and velocity vector $\bar{v}_2^B=(v_{2x}^B, v_{2y}^B, v_{2z}^B)$ of B at the moment $t_2^B$ of epoch transmission.

At clock C the distance $d^{CB}$ from clock C to clock B at the moment $t_2^B$ of epoch transmission is calculated:

$$d^{CB}=\sqrt{(x_2^B-x^C)^2+(y_2^B-y^C)^2+(z_2^B-z^C)^2}, \tag{25}$$

Also calculated is the radial component $v_r^{CB}$ of relative velocity between clock C and clock B according to the formula $$v_r^{CB}\bar{v}_2^{B}\cdot\bar{u}^{CB}, \tag{26}$$

where $\bar{u}^{CB}$ is a unit vector pointing along the line of sight from clock C to clock B at the moment of epoch transmission, and the dot indicates the dot (or inner) product of the two vectors. A positive value of $v_r^{CB}$ corresponds to a distance from clock C to clock B which is increasing with time. An alternative method of determining $v_r^{CB}$ is to compute it by measuring the signal Doppler shift $\Delta f$ in Hertz at clock C and using the formula $$\begin{aligned} v_r^{CB} &= -\lambda(\Delta f) \\ &= -c\frac{\Delta f}{f}, \end{aligned} \tag{27}$$

where f is the carrier frequency transmitted by the satellite, $\lambda$ is the corresponding wavelength at the propagation speed c of light in free space. A positive value of $\Delta f$ corresponds to negative value of $v_r^{CB}$.

At clock C the propagation time of the signal epoch in traveling from clock B to clock C is calculated according to the formula $$t_{prop}^{BC} = \frac{d^{CB}}{c - v_r^{CB}}. \tag{28}$$

An epoch arrival time $s_2^C$ at clock C is now calculated, which is based on clock B's transmission time $t_2^B$ and the signal propagation time, in contrast to the direct measurement of arrival time $t_2^C$ by clock C:

$$\begin{aligned} s_2^C &= t_2^B + t_{prop}^{BC} \\ &= t_2^B + \frac{d^{CB}}{c - v_r^{CB}}. \end{aligned} \tag{29}$$

The last step in clock C's calculations is to compute the correction term $$\epsilon^C = s_2^C - t_2^C \tag{30}$$

for clock C.

Stage 3: At this point, clock C could be synchronized to clock B in the satellite if desired, either by adding $\epsilon^C$ to any unsynchronized reading of clock C, or resetting clock C by incrementing its reading by $\epsilon^C$ as soon as $\epsilon^C$ has been determined.

In order to synchronize clock C to clock A, the correction term $\epsilon^{CA}$ is computed as follows:

$$\epsilon^{CA} = \epsilon^C - \epsilon^A. \tag{31}$$

The synchronization may be performed adding $\epsilon^{CA}$ to any unsynchronized reading of clock C, $t^C$, or resetting clock C from $t^C$ by incrementing its reading by $\epsilon^{CA}$ after $\epsilon^{CA}$ has been determined. Normally the calculation of $\epsilon^{CA}$ is performed at clock C; in that case the value of $\epsilon^A$ (or the measurements at clock A required to calculate it) would be communicated from clock A to clock C by an independent communications link.

Therefore the synchronized time of clock C to clock A is given by:

$$S^C = t^C + \epsilon^{CA} \tag{32}$$

In other words, the synchronization use of $\epsilon^{CA}$ may be implemented in either of 2 ways:

1. Clock C may simply be reset according to $\epsilon^{CA}$; or
2. Clock C is allowed to continue its prior readings which are modified by adding $\epsilon^{CA}$ to its reading and using the result as a synchronized time from clock C.

For example, in the GPS, the satellite broadcasts the set reading of its clock plus a correction term and the user receiver applies the correction term to the set reading to achieve a corrected time.

Description of FIG. 6

FIG. 6 shows an apparatus for determining the correction term $\epsilon^A$ which is used in the calculation of the correction term $\epsilon^{CA}$. An second identical apparatus is used to determine the other correction term cc needed for the calculation of $\epsilon^{CA}$. Thus, FIG. 6 also describes the second apparatus if all occurrences of superscript A are changed to B, and all occurrences of subscript 1 are changed to 2.

An antenna (10) is connected to a satellite signal receiver (12) which receives signals from a satellite containing clock B. Clock A (14) is a continuously running clock which provides a continuous time reading $t^A$ which is available to the satellite signal receiver (12). The output $t^A$ of clock A (14) may also be fed to an optional time corrector (16). Clock A (14) could be an atomic clock or a clock governed by a crystal oscillator. The satellite signal receiver (12) provides three types of data, $t_1^B$, $t_1^A$, and satellite ephemeris data, which are stored in computer memory (18). Also stored in computer memory (18) is the known position ($x^A$, $y^A$, $z^A$) of the satellite signal receiver (12).

The data $t_1^B$, $t_1^A$, satellite ephemeris, and ($x^A$,$y^A$,$z^A$) in memory are available to a central processing unit (20), which has software modules (22), (24), (26), and (28) used in computing $\epsilon^A$. The time $t_1^B$ is the transmission time of an identifiable epoch contained in the signal from the satellite containing clock B, and time $t_1^A$ is the value of the time reading $t^A$ from clock A (14) at the moment that the epoch is received. The satellite ephemeris data is information which permits the calculation of the position and velocity of the satellite at any given time.

Module (22) is a satellite position and velocity calculation in which $t_1^B$ and the satellite ephemeris data are fetched from memory (18) to produce the satellite position ($x_1^B$, $y_1^B$, $z_1^B$) and velocity vector $\bar{v}_1^B$ at time $t_1^B$. The position and velocity vector are fed to module (24), which is a distance and radial velocity calculation. This calculation also requires the known position ($x^A$, $y^A$, $z^A$) of the satellite receiver (12) which is fetched from memory (18). The outputs of module (24) are the distance $d^{AB}$ of the satellite receiver (12) from the satellite containing clock B and the radial velocity $v_r^{AB}$ of the satellite containing clock B at time $t_1^B$. These outputs are fed to module (26) which is a calculation of the propagation time $t_{prop}^{AB}$ of the signal epoch as it travels from the satellite to the satellite signal receiver (12). The propagation time $t_{prop}^{BA}$ is fed to module (28), which is a calculation of $\epsilon^A$. The calculation of $\epsilon^A$ also requires $t_1^B$ and $t_1^A$, which are fetched from memory (18). The output $\epsilon^A$ from module (28) is stored in memory (18). The optional time corrector (16) can fetch $\epsilon^A$ from memory (18) to correct clock A (14). Also, $\epsilon^A$ is available for the subsequent calculation of $\epsilon^{CA}$ which is used to synchronize clock A (14) to clock C.

Although particular embodiments of the invention have been described and illustrated herein, it is recognized that modifications and variations may readily occur to those skilled in the art, and consequently it is intended that the claims be interpreted to cover such modifications and equivalents.

The invention claimed is:

1. A method of synchronizing a plurality of clocks at different locations using a third clock (clock B) comprising the steps of:

determining a correction term, $\epsilon^A$ for a first one of the plurality of clocks (clock A) the correction term being the difference between the computed arrival time of a signal from clock B to clock A if clock A was synchronized to clock B, defined as $s_1^A$, minus the observed time by clock A of arrival of the signal from clock B at clock A;

determining a correction term, $\epsilon^C$ for any selected one or ones of the plurality of clocks (clocks C) to be synchronized, the correction term being the difference between the computed arrival time of a signal from clock B to clock C if clock C was synchronized to clock B, defined as $s_2^A$ minus the observed time by clock C of arrival of the signal from clock B at clock C;

applying the difference between the correction terms, $\epsilon^A$ and $\epsilon^C$, defining a correction term, $\epsilon^{CA}$ for clock C, to synchronize the selected one or ones of the plurality of clocks C for which $\epsilon^C$ has been determined, to clock A.

2. The method of claim 1 wherein $s_1^A$ is computed according to:

$$s_1^A = t_1^B + \frac{d^{AB}}{c - v_r^{AB}}$$

where;

$t_1^B$ is the time of transmission of the signal from clock B according to clock B;

$d^{AB}$ is the distance from clock A to clock B at the time $t_1^B$;

c is the velocity of light in a vacuum;

$v_r^{AB}$ is the radial velocity of clock B relative to clock A at the time $t_1^B$.

3. The method of claim 1 wherein clock B is in a GPS satellite and the signal from the satellite has ephemeris data to allow calculation of $d^{AB}$ and $v_r^{AB}$.

4. The method of claim 3 wherein clocks A and C are on the earth.

5. The method of claim 3 wherein clock A is on the earth and clock C is on a satellite and clock C has its position and velocity computed timely for calculation of $\epsilon^C$.

6. The method of claim 3 wherein clock A is on a satellite and clock C is on a satellite and both clock A and clock C have their position and velocity computed timely for calculation $\epsilon^A$ and $\epsilon^C$ respectively.

7. A method of synchronizing a plurality of clocks at different locations on earth using a clock in a satellite that is in translation relative to the clocks on earth, where an arbitrary one of the clocks on earth is referred to as clock A and an arbitrary other of the clocks on earth is referred to as clock C, and the clock in the satellite is referred to as clock B, and where the process can be used with a single defined clock A, or by designating any clock of the plurality of clocks as clock A, and any other of the clocks of the plurality of clocks as clock B comprising the steps of;

stage 1, at clock A receiving the signal from clock B;

recording the time $t_1^A$, of reception of a specific epoch according to clock A;

recording the time $t_1^B$, of transmission of the epoch according to clock B;

determining the location, $x_1^B$, $y_1^B$, $z_1^B$, and velocity vector $\bar{v}_1^B$, of B at the time $t_1^B$, of the epoch transmission;

determining the radial component $v_r^{AB}$ of relative velocity between clock A and clock B;

determining at clock A the propagation time of the signal epoch in traveling from A to B, $t_{prop}^{BA}$;

determining the epoch arrival time $s^A$, at clock A;

determining the correction term for clock A, $\epsilon^A$;

stage 2, at clock C receiving the signal from clock B;

recording the time $t_2^C$ of reception of a specific epoch according to clock C;

recording the time $t_2^B$ of transmission of the epoch according to clock B;

determining the location $x_2^B$, $y_2^B$, $z_2^B$, and the velocity vector $\bar{v}_2^B$ of B at the time $t_2^B$ of the specific epoch transmission;

determining the radial component $v_r^{CB}$ of relative velocity between clock C and clock B;

determining at clock C the propagation time of the signal epoch in traveling from clock B to clock C, $t_{prop}^{BC}$;

determining the epoch arrival time, $s_2^C$ at clock C;

determining correction term for clock C, $\epsilon^C$;

stage 3, at clock C differencing the correction term $\epsilon^C$ and $\epsilon^A$ to determine $\epsilon^{CA}$;

synchronizing clock C to clock A by applying $\epsilon^{CA}$ to the unsynchronized reading of clock C.

8. The method of claim 7 wherein $s_1^A$ is computed according to:

$$s_1^A = t_1^B + \frac{d^{AB}}{c - v_r^{AB}}$$

where;

$t_1^B$ is the time of transmission of the signal from clock B according to clock B;

$d^{AB}$ is the distance from clock A to clock B at the time $t_1^B$;

c is the velocity of light in a vaccum;

$v_r^{AB}$ is the radial velocity of clock B relative to clock A at the time $t_1^B$.

9. The method of claim 7 wherein clock B is in a GPS satellite and the signal from the satellite has ephemeris data to allow calculation of $d^{AB}$ and $v_r^{AB}$.

10. The method of claim 7 wherein clocks A and C are on the earth.

11. The method of claim 7 wherein clock A is on the earth and clock C is on a satellite and clock C has its position and velocity computed timely for calculation of $\epsilon^C$.

12. The method of claim 7 wherein clock A is on a satellite and clock C is on a satellite and both clock A and clock C have their position and velocity computed timely for calculation $\epsilon^A$ and $\epsilon^C$ respectively.

13. A method of synchronizing a clock in a satellite to a clock on the earth, comprising the steps of:

transmitting a signal $S_W$ from a first clock (clock A) at time $t_1^A$ according to clock A;

recording at clock A the time $t_1^A$ of transmission of signal $S_w$;

recording at the location of the clock in the satellite (clock B) the time $t_1^B$ that signal $S_w$ is received by clock B;

at time $t_1^B$ or at a time known relative to time $t_1^B$, transmitting a signal $S_x$ from the satellite, said signal $S_x$ containing a message indicating the value of $t_1^B$;

recording at clock A the time $t_2^A$ that signal $S_x$ is received by clock A, and recording the value of $t_1^B$ from the message contained in signal $S_x$;

at time $t_2^A$ or at a time known relative to time $t_2^A$, transmitting a signal $S_y$ from clock A;

receiving the signal at clock B at time $t_1^B$ according to clock B;

at time $t_2^B$ or at a time known relative to time $t_2^B$, transmitting a signal $S_z$ from clock B;

recording at clock A the time $t_3^A$ that signal $S_z$ is received by clock A;

determining the characteristic value ξ of relative motion according to the expression $$\xi = \left(\frac{t_3^A - t_2^A}{t_2^A - t_1^A}\right)^{\frac{1}{2}};$$

obtaining the synchronized time $s_1^B$ of reception of signal $S_w$ according to the formula $$s_1^B = \frac{1}{\xi + 1}(t_2^A + \xi t_1^A);$$

determining a correction term $\epsilon^B$, which is $s_1^B - t_1^B$;

sending the value of $\epsilon^B$ to the satellite and having the satellite broadcast the value of $\epsilon^B$ along with its unsynchronized time $t^B$, or sending the value of $\epsilon^B$ to the satellite and having the satellite use $\epsilon^B$ in conjunction with $t^B$ to broadcast a synchronized time.

14. A method of synchronizing a clock in a satellite to a clock on the earth, comprising the steps of:

transmitting a signal $S_w$ from a reference clock (clock A) at time $t_1^A$ according to clock A, said signal $S_w$ containing a message indicating the value of $t_1^A$;

recording at the location of the clock in the satellite (clock B) the time $t_1^B$ that signal $S_w$ is received by clock B, and recording the value of $t_1^A$ from the message contained in signal $S_w$;

at time $t_1^B$ or at a time known relative to time $t_1^B$, transmitting a signal $S_x$ from the satellite;

recording at clock A the time $t_2^A$ that signal $S_x$ is received by clock A;

at time $t_2^A$ or at a time known relative to time $t_2^A$, transmitting a signal $S_y$ from clock A, said signal $S_y$ containing a message indicating the value of $t_2^A$;

recording at clock B the time $t_2^B$ that signal $S_y$ is received by clock B, and recording the value of $t_2^A$ from the message contained in signal $S_y$;

determining the characteristic value ξ of relative motion according to the expression $$\xi = \frac{t_2^B - t_1^B}{t_2^A - t_1^A};$$

obtaining the synchronized time $s_1^B$ of reception of signal $S_w$ according to the formula $$s_1^B = \frac{1}{\xi + 1}(t_2^A + \xi t_1^A);$$

determining a correction term $\epsilon^B$, which is $s_1^B - t_1^B$;

having the satellite broadcast the value of $\epsilon^B$ along with its unsynchronized time $t^B$, or sending the value of $\epsilon^B$ to the satellite and having the satellite use $\epsilon^B$ in conjunction with $t^B$ to broadcast a synchronized time.

* * * * *